United States Patent Office 3,046,380
Patented July 24, 1962

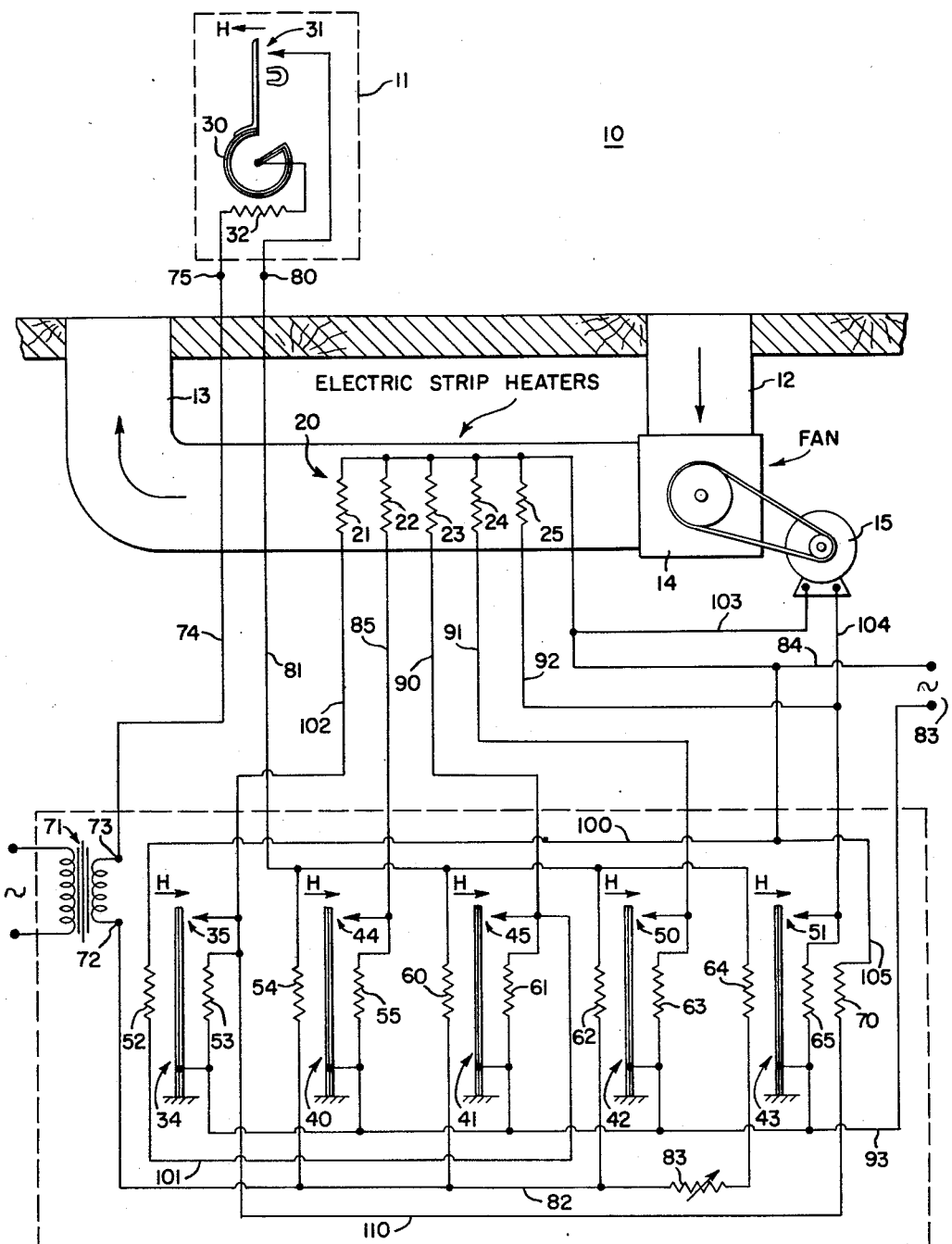

3,046,380
CONTROL APPARATUS
Elmer A. Carlson, Richfield, Minn., assignor to Minneapolis-Honeywell Regulator Company, Minneapolis, Minn., a corporation of Delaware
Filed Oct. 24, 1960, Ser. No. 64,339
10 Claims. (Cl. 219—20)

The present invention is concerned with an improved temperature control system; in particular, the system is made up of a panel housing a number of thermally operated switches which are inter-related in a thermal manner to produce a random type of operation of temperature conditioning apparatus connected to the switches.

With a constant effort to improve control systems used to control temperature changing apparatus, the desirability of having the output of the temperature changing apparatus modulate with the conditioning load is recognized. Where a single temperature changing apparatus is used and the apparatus is controlled in an on-off manner, the operating time of the temperature changing apparatus depends on the conditioning load whether the load is heating or cooling. In heating apparatus, during a certain load condition, a furnace may be energized 1/10 of the time. Such a mode of operation produces bursts of heat from the furnace which pose many problems in maintaining the temperature constant in the space.

The present invention is concerned with a control system for controlling a number of temperature changing apparatuses so the total heat output of the temperature changing apparatuses is modulated. The heat is supplied to the space in a steady manner depending upon the load experienced in the space. To produce the new and improved control system a plurality of switches are connected to control the temperature changing apparatuses in a random manner with the temperature changing apparatuses being energized a certain percent of the total time depending upon the load experienced by a space temperature responsive apparatus or thermostat which is responsive to the need for the operation of the condition changing apparatus.

An object of the present invention is to provide an improved temperature control system.

Another object of the present invention is to provide a temperature control system for controlling a number of temperature changing apparatuses in a random manner so the total heat output of the apparatuses is indicative of the load.

These and other objects will become apparent upon a study of the following specification and drawing.

A single figure contains a schematic representation of the temperature control system as applied to electric strip heaters for heating air delivered to a space.

Referring to the single figure, the temperature of the space 10 is controlled by a temperature responsive device or thermostat 11 which is located in the space. A conventional forced air heating system is shown for circulating air from space 10 through a return duct 12 to a supply duct 13 by a fan 14. The fan is driven by a conventional motor 15. Located in a plenum 20, which is connected to the supply duct are a plurality of electric strip heaters 21, 22, 23, 24, and 25. When the strip heaters are energized, air passing through plenum 20 from space 10 is heated.

Thermostat 11 comprises a temperature responsive device or bimetal 30 which controls the operation of a switch 31. When bimetal 30 cools down, switch 31 is closed. A heater 32 contained in the thermostat is connected in series with switch 31. The heater is energized whenever switch 31 is closed to provide the conventional "heat anticipation" to cause switch 31 to close and open by an amount depending upon the difference between the actual space temperature and the control point selected by thermostat 11. The cycling rate of the thermostat can be selected by the size of heater 32.

A panel or housing 33 contains a number of conventional thermally operated switching devices. Each of the devices is of a conventional type comprising a bimetal which closes an associated switch when the temperature of the bimetal increases above a predetermined value. While the number of thermal operators contained in panel 33 may vary, five thermal operators 34, 40, 41, 42, and 43 are shown with associated switches 35, 44, 45, 50, and 51, respectively. All of the switches associated with the thermal operators are calibrated to close when the temperature of the thermal operator reaches some predetermined value; however, while there is a certain desirability of having all the thermal operators calibrated at the same temperature, the operation of the system may be satisfactory with a certain variation in the temperature at which the switch of each of the thermal operators closes.

Each of the thermal operators 34, 40, 41, 42, and 43 has a plurality of heaters thermally associated therewith. The heaters are located close to the bimetal operators; so that, when the temperature of the bimetal is increased upon the energization of one or both of the heaters, the associated switch is closed. Thermal operator 34 has two heaters 52 and 53, thermal operator 40 has two heaters 54 and 55, thermal operator 41 has two heaters 60 and 61, thermal operator 42 has two heaters 62 and 63, and thermal operator 43 has three heaters 64, 65, and 70.

A source of power or step down transformer 71 is provided with a pair of output terminals 72 and 73 to supply low voltage to the control circuit for panel 33.

The heaters 54, 60, 62, and 64 are connected in parallel to source of power 71 by thermostat 11; so that, upon a call for heat by thermostat 11, the heaters are simultaneously energized. The circuit for the connection is traced as follows: from secondary terminal 73 of the source of power, a conductor 74, a terminal 75 of thermostat 11, heater 32, switch 31 of terminal 80, a conductor 81, which is connected to the upper extremity of each of the heaters 54, 60, 62, and 64. The lower extremities of each of the heaters 54, 60, and 62 are connected to a conductor 82. The lower extremity of heater 64 is connected to conductor 82 through a variable resistor 83 which reduces the heat output of heater 64. The previously mentioned circuit can be further traced from conductor 82 and back to the output terminal 72 of the source of power. Heaters 54, 60, and 62 are substantially of the same value, but heater 64 is larger and its effectiveness can be controlled by the size of resistor 83.

High resistance heaters 55, 61, 63, and 65 are connected in parallel with the switches 44, 45, 50, and 51, respectively, to provide off cycle heat to their associated bimetals. With any one of switches 44, 45, 50 and 51 open, the respective off cycle heater is connected in series with the respective strip heater, but the high resistance of heaters 55, 61, 63 and 65 reduces the current to a negligible level as far as the strip heaters are concerned. Switches 44, 45, 50, and 51, are connected to supply power from a source 83 for strip heaters 22, 23, 24, and 25, respectively, by a circuit traced as follows: from one side of the source of power 83, a conductor 84 to the upper extremity of each of the heaters 22, 23, 24, and 25, from the lower extremity of the respective heaters by parallel circuits to one side of switches 44, 45, 50, and 51, respectively, by conductors 85, 90, 91, and 92, respectively, from the other side of the switches 44, 45, 50, and 51, to a conductor 93, and back to source of power 83. Upon the call for heat by thermostat 11, switch 31 closes to energize heaters 54, 60, 62, and 64, which increases the temperature of the respective thermal operators to close the respective switches 44, 45, 50, and 51. The mentioned switches close the previously mentioned circuit to energize the strip heaters. When any one of the switches closes the respective high resistance heaters 55, 61, 63, and 65 are shunted out; however, when the respective switches open, the shunt connected heaters are energized to provide an off cycle heating for the thermal operator through the same circuit which energizes the strip heaters.

Thermal operator 34 has heater 52 which is thermally associated therewith and connected to source of power 83 by switch 45 through a circuit traced as follows: from source of power 83, conductor 84, a conductor 100, heater 52, a conductor 101, switch 45, conductor 93, and back to the source of power 83. Thermal operator 34 has switch 35 connected to control the operation of strip heater 21 by a circuit traced as follows: from source of power 83, conductor 84, to the upper extremity of heater 21, from the lower extremity of the heater to conductor 102, switch 35, conductor 93, and back to source of power 83. When switch 35 closes, high resistance heater 53 is shunted out, but upon switch 35 opening, off cycle heating is supplied to thermal operator 34 by heater 53 through the same circuit which energizes strip heater 21 when switch 35 is closed. Thermal operator 34 is energized by switch 45 of thermal operator 41 purposely to have the control of thermal operator 34 by a thermal operator which is thermally remote from the thermal operator 34; otherwise, the control of thermal operator 34 through 52 could be accomplished by the switches of the various other thermal operators 40, 41, or 42.

Thermal operator 43 has switch 51 also connected to control fan motor 15 by a circuit traced as follows: from source of power 83, conductor 84, a conductor 103, a fan motor 15, a conductor 104, switch 51, conductor 93, and back to source of power 83. When thermal operator 43 closes switch 51, the fan is operated and a small strip heater 25 is energized so the air delivered to space 10 is slightly tempered. By the adjustment in the size of resistor 83, switch 51 can be made to close before switches 44, 45, and 50 to be sure the fan is energized before the electric strip heaters are energized. Another obvious way of accomplishing the same would be to calibrate operator 43 so switch 51 closes at a lower temperature.

A further heater 70 associated with thermal operator 43 is connected to be controlled by switch 35 by a circuit traced as follows: from source of power 83, conductor 84, conductor 105, heater 70, a conductor 110, switch 35, conductor 93, and back to the source of power 83. By means of heater 70, thermal operator 43 is maintained in a position to keep the fan operating as long as thermal operator 34 has switch 35 closed to energize heater 21. Even though thermal operator 43 closes switch 51 before switches 44, 45, and 50 are closed after the call for heat by thermostat 11, thermal operator 34 may maintain heater 21 energized after the thermal operators 40, 41, and 42 have terminated the energization of their respective heaters. To insure that the fan remains energized as long as heater 21 is energized, additional heat is supplied to thermal operator 43 by heater 70 whenever switch 35 is closed.

For the proper operation of the present invention, the various thermal operators 34, 40, 41, 42, and 43 are thermally confined by being contained in panel 33. While the heaters associated with each of the thermal operators are effective to change the temperature of the bimetal which results in the closing of the associated switch, the heat from other heaters associated with other thermal operators has some effect upon the over-all temperature in the panel and thus the operation of thermal operators which are not directly associated with the heater. For example, when thermostat 11 calls for heat and switch 31 closes, heaters 54, 60, and 62 are energized to increase the temperature of their respective thermal operators. If the thermal operators were thermally isolated, the movement of the bimetal would follow the operation of switch 31, and depending upon the percent close time of switch 31, switches 44, 45, and 50 would have a definite on time but only slightly lagging the operation of switch 31. As the heat from heater 54 and other sources of heat in panel 33 can have some effect upon thremal operator 42, the operation of switch 50 may not have the same pattern as the other switches in the panel. In fact, with a cycling thermostat such as 11, a random type of operation of the strip heaters 22, 23, and 24 as controlled by the thermal operators 40, 41, and 42 takes place. The random operation produces a smooth heat output to space 10 and the amount of heat depends upon the heating load experienced by thermostat 11.

*Operation*

As shown, thermostat 11 is satisfied and all of the switches in panel 33 are open to deenergize the heaters and the fan. Assuming that the temperature of space 10 drops as the result of a small heating load being experienced by space 10. Thermostat 11 will begin to cycle by a periodic closing of switch 31 for a certain percent of the total time. The operation is conventional by a cycling thermostat. Once switch 31 closes, heat is provided by heater 32 to increase the temperature in the thermostat and to cause the switch 31 to open before the space temperature is increased to the control point or temperature selected by thermostat 11. Upon thermostat 11 cycling to close switch 31 a predetermined percent of the total time period, heaters 54, 60, 61, and 64 are periodically energized. By the proper selection of the resistance 83 and the size of heater 64, thermal operator 43 will reach the predetermined temperature to close switch 51 before the other thermal operators 40, 41, and 42 reach the predetermined temperature for closing their respective switches. Fan 14 and heater 25 are then energized to begin the circulation of air to space 10. Since a small amount of heat is supplied to the air by heater 25, a tempering effect is obtained preventing the undesirable circulation of unheated air. The amount of heat supplied by heater 25 is small to only satisfy thermostat 11 for very light loads.

As heaters 54, 60, and 62 continue to cycle in response to the operation of switch 31, the temperature of thermal operators 40, 41, and 42 increases until their respective switches close. After a certain period of operation of the system, the thermal operators 40, 41, and 42 will not cycle together, but a random or nonuniform type of operation of switches 44, 45, and 50 is obtained. The total on time of the heaters 22, 23, and 24 associatetd with the thermal operators depends upon the total on time of switch 31 or the heating load experienced by thermostat 11. By the random type of operation, the heat output of the heaters will be somewhat modulated and steady so the air temperature leaving duct 13 is relatively constant.

The random type of operation can be compared to a normal type of operation to see the improved results of the present invention. For example, if thermal operators 40, 41, and 42 remained in step to all bring about operation of heaters 22, 23, and 24, in a definite, cyclic manner, the heat output from plenum 20 would come in pulses and the temperature of the air leaving the duct 13 would vary drastically. Since the normal operation of thermal operators 40, 41, and 42 is not together a random type of operation is obtained. Heater 21 may be on a certain time period, then heater 24, and then heater 23 or some other sequence, even to overlap in their operation. The pattern of the operation is somewhat unpredictable as the temperature of the thermal operators is affected by other heat sources in panel 33 such as the various heaters associated with the other heat sources and the effect of the switch heat of the various switches.

A staging operation is obtained by using thermal operator 34 to control heater 21. Since thermal operator 34 is controlled by switch 45 of thermal operator 41, heater 21 will not be energized until switch 45 has closed a sufficient amount of time to bring about operation of operator 34. As the heating load of space 10 increases to maintain switch 31 closed a longer percent of the total time, switch 45 will also be closed a longer percent of the total time. The heat output of heater 52 will increase the temperature of thermal operator 34 to close switch 35.

Since a certain amount of lag will take place in the system and thermal operator 34 may maintain switch 35 closed after thermostat 11 is satisfied and the other thermal operators 40, 41, and 42 are deenergized, the need of a means to maintain operation of the fan until all of the heat sources are deenergized is needed. The heater 70 of thermal operator 43 is energized when switch 35 is closed to increase the temperature of operator 43 so fan 14 remains energized as long as thermal operator 34 is calling for the operation of heater 21.

All of the operators have the off cycle heaters. The off cycle heaters provide for stabilization of the control system and tend to reduce the lag of the system. For example, the off cycle heaters 55, 61, and 63 will be deenergized when switches 44, 45, and 50 are closed to act as anticipation heaters. As soon as the switches are closed, and the shunt heater is deenergized, the associated thermal operator will lose some heat and the associated switch of the thermal operator will open before the heat source controlled by thermostat 11 is deenergized. The off cycle heat also contributed to the total heat of panel 33 and can be effective to increase the random type of operation of the thermal operators which provides the improved results of the control system.

While the present invention has been described as associated with a temperature control system for controlling a heat source, the intent is to limit the scope of the invention only by the appended claims in which I claim:

1. In a temperature control system for controlling a plurality of electric heaters and a fan which circulates air across the heaters to a space in which the temperature is being controlled; a plurality of switch means adapted to control the heaters and the fan; each of said switch means comprising a switch, a thermal operator for said switch to close said switch upon heating said operator to a predetermined temperature, and a first and a second electric heater for heating said operator, said first heater of each operator being connected in parallel with said switch of the respective operator to provide off cycle heat to said operator; a panel; means for mounting said plurality of switch means in said panel so a thermal relation exists between said switch means; a fast cycling space temperature responsive switch means; a source of power; and circuit means comprising said space switch means for connecting said second heaters in a parallel circuit and to said source so that upon said temperature responsive switch means closing said second heaters are energized, said thermal operators being affected by the combined effect of all of the heat sources in said panel whereby even though said second heaters are energized cyclically by equal amount said plurality of switch means operate in a random manner.

2. In a temperature control system for controlling a plurality of electric heaters and a fan which circulates air across the heaters to a space in which the temperature is being controlled; a plurality of switch means adapted to control the heaters and the fan; each of said switch means comprising a switch, a thermal operator for said switch so upon heating said operator to a predetermined temperature said switch is closed, and an electric heater thermally associated with said operator for heating said opeartor; a panel; means for mounting said plurality of switch means in said panel so a thermal relation exists between said switch means, space temperature responsive switch means providing a closed circuit a percentage of time varying with the space heating load; a source of power; and circuit means comprising said space switch means for connecting said heaters in a parallel circuit and to said source so that upon said temperature responsive switch means closing a predetermined percent of the total operating time said heaters are energized, said thermal operators being affected by the combined effect of all of the heat sources in said panel whereby even though said heaters are energized by equal amount said plurality of switch means operate in a random manner to produce a modulated heat output from the electric heaters varying with space heating load.

3. In a temperature control system for controlling a plurality of temperature changing apparatuses, a plurality of switching means adapted to control the apparatuses; each of said switching means comprising a switch adapted to control one of said changing apparatuses, a temperature responsive operator for said switch, said switch being closed upon heating said operator to a predetermined temperature, and a first and a second electric heater for heating said operator, said first heater being connected in parallel with said switch to be energized when the changing apparatus connected to said switch is deenergized; means for thermally confining a number of heat sources; means for associtting said plurality of switch means in said last mentioned means so the heat developed for one of said operators can affect the other of said operators; space temperature responsive switch means; a source of power; and circuit means including said space switch means for connecting all of said second heaters in parallel and to said source so that upon said space temperature responsive switch means closing said second heaters are energized, said thermal operators being affected by the combined effect of all of the heat sources in said panel whereby even though said second heaters are energized by equal amount to produce a cyclic pattern of operation of changing apparatuses said plurality of switch means operate in a non-regular manner to produce a combined modulated output from said changing apparatuses.

4. A temperature control system for controlling the operation of a plurality of temperature conditioning units for changing the temperature of a space comprising; a plurality of switches, a thermal operator for each of said switches, an enclosure for housing said thermal operators and switches, said switches are closed when the temperature of a respective operator reaches a selected temperature, and at least two heat sources thermally associated with each of said operators; space temperature responsive switch means; a source of power; electrical connection means including said space switch means for connecting one of said heat sources of each of said operators in a parallel circuit and to said source whereby upon a need for a change in temperature in the space said space switch means closes to energize said one heat source of all of said operators however the effect of the heat in said housing varies the operation of said operators to produce an irregular operation of the conditioning units, and circuit means connecting said second heat source of each operator to provide heat to said operator when said switch of the respective operator is open for off cycle heat.

5. A temperature control system for controlling the operation of a plurality of temperature conditioning units for changing the temperature of a space comprising, a plurality of switches, a thermal operator for each of said switches to close said switches when a respective thermal operator reaches a selected temperature, an enclosure for housing said thermal operators, at least one electric heater thermally associated with each of said operators, circuit means connecting at least one heater of said operators in a parallel circuit, space temperature responsive switch means having a cyclic operation depending on the conditioning load of the space, a source of power, and electrical connection means including said space switch means for connecting said parallel circuit to said source whereby upon a need for a change in temperautre in the space said space switch means closes to energize said heaters of all of said operators, said enclosure thermally connecting said operators by distributing the heat therein so the heat of one heater effects a thermal operator other than said operator said one heater is associated with whereby an irregular operation of said operators exists even though said heaters are identically energized in response to said space switch means.

6. A temperature control system for controlling the operation of a plurality of temperature conditioning units for changing the temperature of a space comprising, a plurality of switches adapted to control said temperature conditioning units, a condition responsive operator for each of said switches to close said switches when a respective operator reaches a selected condition level, an enclosure for housing said operators, at least one condition changer associated with each of said operators, space temperature responsive switch means cyclically operating in response to the temperature conditioning load of the space, a source of power, electrical connection means including said space switch means for connecting said condition changer of each of said operators to said source whereby upon a need for a change in temperature in the space said space switch means closes to energize said condition changer of all of said operators, said enclosure operably associating said operators for making it possible for one condition changer of one operator to effect another operator whereby an irregular operation of said operators exists even though said condition changers are identically energized in response to said space switch means.

7. In a temperature control system for controlling a plurality of electric sources of heat, a plurality of switch means and a single switch means; each of said switch means and said single switch means comprising, a switch, a temperature responsive operator for said switch, said switch being closed upon heating said operator to a predetermined temperature, and a first and a second electric heater for heating said operator, each of said switches of said plurality of switch means being adapted to control one of the electric sources of heat and said switch of said single switch means being adapted to control one of the sources of heat, said first heater of each switch means being connected in parallel with said switch to be energized when said source of heat connected to said switch is deenergized; a panel; means for mounting said plurality of switch means and said single switch means in said panel so the heat developed for one of said operators can affect other of said operators; space temperature responsive switch means; a source of power; circuit means including said space switch means for connecting in parallel all of said second heaters of said plurality of switch means and to said source so that upon said temperature responsive switch means closing said second heaters are energized; and circuit means including said switch of one of said plurality of switch means which is not in close thermal contact with said single switch means for connecting said second heater of said single switch means to said source, said thermal operators being effected by the combined effect of all of the heat sources in said panel whereby even though said second heaters are energized an equal amount to produce a cyclic pattern of operation of said switches said plurality switch means and said single switch means operate in a non-regular manner.

8. In a temperature control system for controlling a plurality of electric sources of heat and a fan for moving air over the sources of heat to a space; a plurality of switch means and a single switch means; each of said switch means and said single switch means comprising, a switch, a temperature responsive operator for said switch, said switch being closed upon heating said operator to a predetermined temperature, and an electric heater for heating said operator; all but one of said switches of said plurailty of switch means being adapted to control one of the electric sources of heat and said switch of said single switch means being adapted to control one of the sources of heat, said one of said plurality of switches being adapted to control the fan; a panel; means for mounting said plurality of switch means and said single switch means in said panel so the heat developed for one of said operators can affect other of said operators; space temperature responsive switch means; a source of power; circuit means including said space switch means for connecting all of said heaters of said plurality of switch means in a parallel circuit and to said source so that upon said temperature responsive switch means closing said heaters are energized; circuit means including said switch of one of said plurality of switch means which is not in close thermal contact with said single switch means for connecting said heater of said single means to said source; further heater means associated with said operator of said one switch; and means connecting said further heater means to be controlled by said single switch so said fan remains energized until all of said sources of heat are deenergized, said thermal operators being effected by the combined effect of all of the heat sources in said panel whereby even though said second heaters are energized an equal amount to produce a cyclic pattern of operation of said switches said plurality switch means and said single switch means operate in a non-regular manner.

9. In a temperature control system for controlling a plurality of electric sources of heat and a fan for moving air over the sources of heat to a space, a plurality of switch means and a single switch means, each of said switch means and said single switch means comprising a switch, a temperature responsive operator for said switch, said switch being closed upon heating said operator to a predetermined temperature, and an electric heater for heating said operator, all but one of said switches of said plurality of switch means being adapted to control one of the electric sources of heat and said switch of said single switch means being adapted to control one of the source of heat, said one of said plurality of switches being adapted to control the fan, a panel, means for mounting said plurality of switch means and said single switch means in said panel so the heat developed for one of said operators can affect other of said operators, space temperature responsive switch means, a source of power, circuit means including said space switch means for connecting all of said heaters of said plurality of switch means to be simultaneously energized by said source so that upon said temperature responsive switch means closing said heaters are energized, circuit means including said switch of one of said plurality of switch means which is not in close thermal contact with said single switch means for connecting said heater of said single switch means to said source, further means associated with said operator of said one switch means connecting said further means to be controlled by said single switch so said fan remains energized until all of said sources of heat are deenergized, said thermal operators being effected by the combined effect of all of the heat sources in said panel whereby even though said second heaters are energized an equal amount to produce a cyclic pattern of operation of said switches said all but one of said plurality switch means and said single switch means operate in a non-regular manner.

10. In a temperature control system for controlling a plurality of electric heaters and a fan for circulating air over the heaters to a space in which the temperature is to be controlled; a plurality of switch means adapted to control the heaters; each of said switch means comprising a switch, a temperature responsive operator for said switch, said switch being closed upon said operator reaching a predetermined temperature, and an electric heater for heating said operator; a panel; means for mounting said plurality of switch means in said panel so the heat developed for one of said operators can affect other of said operators; space temperature responsive switch means having a cyclic operation which varies with the heating load of the space; a source of power; circuit means including said space switch means for connecting at least two of said heaters to said source so that upon said switch means closing said two heaters are energized to cause two respective operators to increase in temperature; circuit means including said switch of one of said two operators for connecting a heater of another operator to said source of power, and means associated with said another operator adapted to control the fan whenever said switch of said another operator is closed; said thermal operators being effected by the combined effect of all of the heat sources in said panel whereby even though said heaters are energized an equal amount to produce a cyclic pattern of operation of said switches said plurality of switch means operate in a non-cyclic pattern of operation.

References Cited in the file of this patent
UNITED STATES PATENTS

| | | |
|---|---|---|
| 2,281,399 | Wattles | Apr. 28, 1942 |
| 2,640,649 | Rusler | June 2, 1953 |
| 2,958,755 | Miller | Nov. 1, 1960 |
| 2,978,228 | Carlson | Apr. 4, 1961 |